(12) United States Patent
Dalmasso et al.

(10) Patent No.: US 12,427,981 B2
(45) Date of Patent: Sep. 30, 2025

(54) AUTOMATIC RECOGNITION OF ANOMALOUS SITUATIONS ALONG ROADS TRAVELLED BY MOTOR-VEHICLES FOR INTELLIGENT MOTOR-VEHICLE DRIVING SPEED CONTROL ALONG THE ROADS

(71) Applicant: C.R.F. SOCIETA' CONSORTILE PER AZIONI, Orbassano (IT)

(72) Inventors: Paola Dalmasso, Orbassano (IT); Silvano Marenco, Orbassano (IT); Nicola Poerio, Orbassano (IT); Giuliana Zennaro, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 362 days.

(21) Appl. No.: 17/792,744

(22) PCT Filed: Jan. 18, 2021

(86) PCT No.: PCT/IB2021/050341
§ 371 (c)(1),
(2) Date: Jul. 14, 2022

(87) PCT Pub. No.: WO2021/144772
PCT Pub. Date: Jul. 22, 2021

(65) Prior Publication Data
US 2023/0037798 A1    Feb. 9, 2023

(30) Foreign Application Priority Data
Jan. 16, 2020   (IT) .................. 102020000000754

(51) Int. Cl.
*B60W 50/00*    (2006.01)
*B60W 30/14*    (2006.01)
(Continued)

(52) U.S. Cl.
CPC .......... *B60W 30/143* (2013.01); *B60W 50/16* (2013.01); *G08G 1/0112* (2013.01); *G08G 1/0133* (2013.01)

(58) Field of Classification Search
CPC .... B60W 30/14; B60W 50/16; G08G 1/0112; G08G 1/0133
(Continued)

(56) References Cited

U.S. PATENT DOCUMENTS 10,509,695 B1 * 12/2019 Averbuch ............... G06N 20/00
10,979,442 B2 *  4/2021 Yamanashi ............ G08B 25/10
(Continued)

FOREIGN PATENT DOCUMENTS

DE   102016218287 A1   3/2018

OTHER PUBLICATIONS

Logistic Funciton—Wikipedia, Jan. 15, 2020 (Year: 2020).*
(Continued)

*Primary Examiner* — Tiffany P Young
*Assistant Examiner* — Michael T Dowling
(74) *Attorney, Agent, or Firm* — Harness, Dickey & Pierce, P.L.C.

(57) ABSTRACT

System for automatically recognising anomalous situations along roads travelled by motor-vehicles for intelligent motor-vehicle driving speed control along roads. The system comprises data processing resources configured to: receive and process data transmitted by the motor-vehicles to recognise anomalous situations along the roads travelled by the motor-vehicles based on a recognition algorithm, when anomalous situations are recognised along roads travelled by the motor-vehicles, generate associated alert events and compute reference driving speeds along the roads recognised to be affected by anomalous situations, and transmit data representative of the alert events and of the reference
(Continued)

driving speeds along the roads recognised to be affected by anomalous situations.

17 Claims, 3 Drawing Sheets

(51) Int. Cl.
*B60W 50/16* (2020.01)
*G08G 1/01* (2006.01)

(58) Field of Classification Search
USPC .......................................................... 701/93
See application file for complete search history.

(56) References Cited

U.S. PATENT DOCUMENTS

| | | | |
|---|---|---|---|
| 2016/0171889 A1* | 6/2016 | Park ..................... | G08G 1/0112 701/93 |
| 2019/0100216 A1* | 4/2019 | Volos .................... | G06Q 40/08 |
| 2020/0226920 A1* | 7/2020 | Takenaka ......... | G08G 1/096775 |

OTHER PUBLICATIONS

International Search Report and Written Opinion of the ISA issued in PCT/IB2021/050341, mailed May 26, 2021; ISA/EP.
International Preliminary Report on Patentability issued in PCT/IB2021/050341, dated May 12, 2022.
Written Opinion of the International Preliminary Examining Authority issued in PCT/IB2021/050341, mailed Feb. 21, 2022.

\* cited by examiner

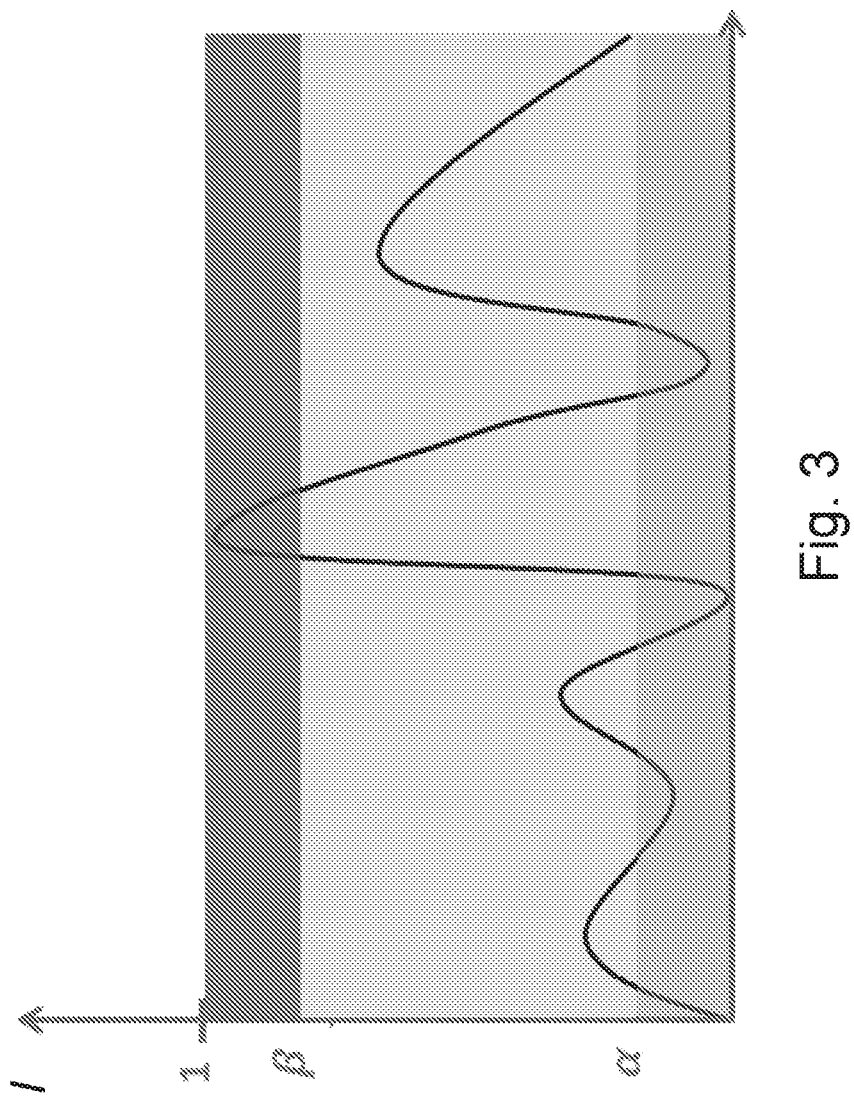

AUTOMATIC RECOGNITION OF ANOMALOUS SITUATIONS ALONG ROADS TRAVELLED BY MOTOR-VEHICLES FOR INTELLIGENT MOTOR-VEHICLE DRIVING SPEED CONTROL ALONG THE ROADS

CROSS-REFERENCE TO RELATED APPLICATIONS

This patent application is a U.S. National Phase Application under 35 U.S.C. 371 of International Application No. PCT/IB2021/050341, filed on Jan. 18, 2021, which claims the benefit of the Italian patent application No. 102020000000754 filed on Jan. 16, 2020. The entire disclosures of the above-identified applications are incorporated by reference.

TECHNICAL FIELD OF THE INVENTION

The present invention relates in general to assistance to motor-vehicle drivers, and in particular to automatic recognition of anomalous situations along roads travelled by motor-vehicles for intelligent motor-vehicle driving speed control along the roads.

The present invention finds application to any type of road motor-vehicle, regardless of whether it is used for the transport of people, such as a car, a bus, a camper van, etc., or for the transport of goods, such as an industrial motor vehicle (truck, B-train, trailer truck, etc.) or a light or medium-heavy commercial vehicle (light van, van, pick-up trucks, etc.), as well as to any type of road, be it an urban, suburban, extra-urban road or a motorway, with one or more lanes, etc.

BACKGROUND OF THE INVENTION

As is known, in recent years car manufacturers have invested considerable resources in the search for advanced driver assistance systems (ADAS) in order to improve safety and driving comfort.

For this reason, and as they will help achieve the targets imposed by the EU for reducing road accidents, ADAS are one of the fastest growing segments in the automotive sector and are set to become increasingly popular in the coming years.

The safety features of these systems are designed to prevent collisions and accidents, provide technologies that alert drivers of potential issues, or to avoid collisions by implementing safeguard measures and by taking control of motor vehicles. Adaptive features can automate lighting, provide adaptive cruise speed control, automate braking, incorporate GPS/traffic alerts, connect smartphones, alert drivers of other vehicles to hazards, keep drivers in the correct lane, or show what is in the blind spots.

ADAS are based on vision/camera systems, sensor systems, automotive data networks, Vehicle-to-Vehicle (V2V) or Vehicle-to-Infrastructure (V2I) communication systems. Next-generation ADAS systems will increasingly take advantage of wireless connectivity to add value to V2V or V2I communication. Technological developments such as the integration of radars and cameras, and the fusion of sensors among multiple applications, are expected to result in a reduction in costs that could lead to a more significant penetration of ADAS into the market of compact motor vehicles. The end point of these technological developments is usually defined as autonomous driving motor vehicles or autonomous motor vehicles.

One of the many ADASes is represented by the "Intelligent Speed Adaptation" or "Intelligent Speed Assist" (ISA), through which the driving speed of a motor vehicle may be adjusted to meet the speed limits on the road travelled and which can be determined via different known technologies (communication with infrastructure, front cameras, etc.).

The ISA assists the driver in always respecting the speed limits, especially if they frequently change on the same road at different points or at different times, such as in areas near schools, where the speed limits may be different depending on the children's hours of access to the school.

An ISA can be either passive or active, depending on whether there is a simple warning to the driver that he is trespassing the limits or that an intervention will take place in order to automatically reduce the driving speed of the motor vehicle. In the event of mere signalling, acoustic and visual devices, but also tactile devices, are operated, for example by causing the accelerator pedal to vibrate. The active systems intervene autonomously, but the driver can often deactivate them manually and temporarily.

US 2016/171889 A1 discloses a traffic informational system including a traffic information collector configured to collect information on traffic flow. A traffic information generator is configured to detect a speed change point at which an average vehicle speed on a road changes based on the information on the traffic flow and to generate traffic information including position information on the speed change point and a target speed after a vehicle passes the speed change point. A traffic information provider is configured to transmit the traffic information to a vehicle controller for automatically controlling acceleration or deceleration of the vehicle based on the target speed.

DE 10 2016 218 287 A1 discloses a method for driving a motor vehicle comprising a navigation device with at least one stored path section, a cruise speed control system designed to adjust the speed of the motor vehicle to a target speed, and a communication device designed to receive and/or transmit road traffic information representative of the traffic density over at least one section of the path and based on which the nominal speed of the motor vehicle is determined.

OBJECT AND SUMMARY OF THE INVENTION

The Applicant has found that the ISAs currently on the market, although satisfactory in many respects, have margins of improvement, in particular from the point of view of the expansion of the contexts of use, so as to go beyond the traditional one for which they were designed, that is, the respect of the speed limits prescribed by the regulations in force.

Aim of the present invention is therefore to improve ISAs so as to extend their use to new contexts with respect to the traditional ones.

According to the present invention, a system for automatically recognising anomalous situations along roads travelled by motor-vehicles for intelligent motor-vehicle driving speed control along the roads is provided, as claimed in the attached claims.

BRIEF DESCRIPTION OF THE DRAWINGS

FIG. 3 shows the trend of a quantity computed by the system for automatically recognising anomalous situations along roads travelled by motor-vehicles for intelligent motor-vehicle driving speed control along the roads.

DETAILED DESCRIPTION OF PREFERRED EMBODIMENTS OF THE INVENTION

The present invention will now be described in detail with reference to the accompanying drawings to enable a skilled person to realize and use it. Various modifications to the embodiments presented shall be immediately clear to persons skilled in the art and the general principles disclosed herein could be applied to other embodiments and applications but without thereby departing from the scope of protection of the present invention as defined in the appended claims. Therefore, the present invention should not be considered limited to the embodiments described and shown, but should be granted the widest protective scope in accordance with the features described and claimed.

Where not otherwise defined, all the technical and scientific terms used herein have the same meaning commonly used by persons of ordinary skill in the field pertaining to the present invention. In the event of a conflict, this description, including the definitions provided, shall be binding. Furthermore, the examples are provided for illustrative purposes only and as such should not be considered limiting.

In particular, the block diagrams included in the accompanying figures and described below are not to be understood as a representation of the structural characteristics, or constructive limitations, but must be interpreted as a representation of functional characteristics, properties that is, intrinsic properties of the devices and defined by the effects obtained or functional limitations that can be implemented in different ways, therefore in order to protect the functionalities thereof (possibility of functioning).

In order to facilitate understanding of the embodiments described herein, reference will be made to some specific embodiments and a specific language will be used to describe them. The terminology used herein is for the purpose of describing only particular embodiments, and is not intended to limit the scope of the present invention.

Figure 1:
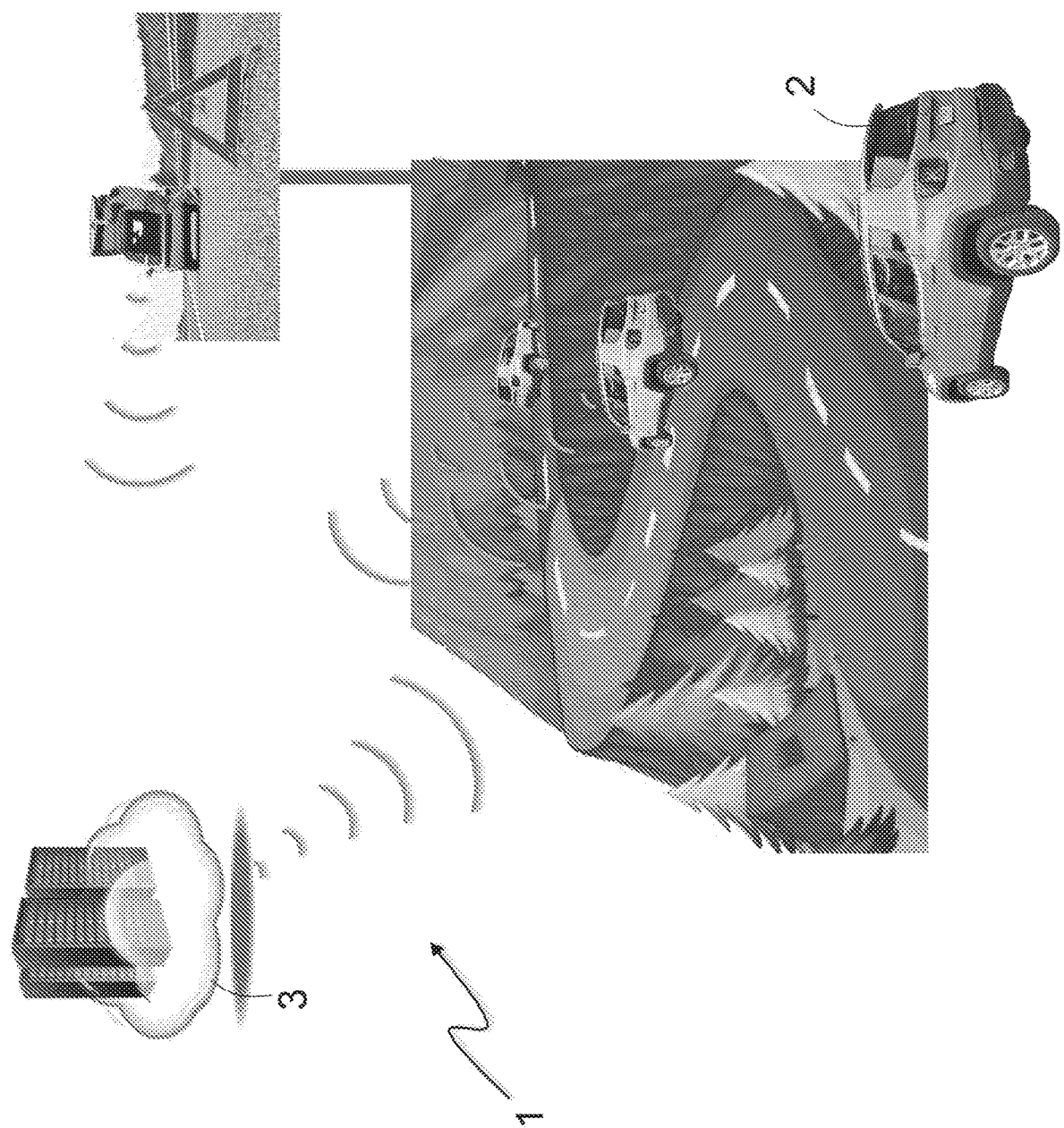
FIG. 1 shows a block diagram of a system for automatically recognising anomalous situations along roads travelled by motor-vehicles for intelligent motor-vehicle driving speed control along the roads.

FIG. 1 schematically shows a system or infrastructure, referenced as a whole with reference numeral 1, designed to offer to motor-vehicles 2 suitably equipped in the manner described below a service for automatically recognising anomalous situations along roads travelled by motor-vehicles 2 for intelligent motor-vehicle driving speed control along the roads.

The service for automatically recognising anomalous situations along roads can be provided through different service architectures, depending on the application context and the performance to be achieved.

In a more classical embodiment, the service for automatically recognising anomalous situations along roads can be provided by a software application run by data processing resources 3 provided by a remote data centre in communication with the motor-vehicles 2 to receive therefrom data that allow the recognition of anomalous situations along roads travelled by motor-vehicles 2 and provide them, if anomalous situations along the roads are recognised, with data that can be used by the motor-vehicles 2 for intelligent motor-vehicle driving speed control along the roads.

In a different more advanced embodiment, the service for automatically recognising anomalous situations along roads can be provided by exploiting the new technologies provided by the new mobile communication networks, in particular the 5G network, specifically the technology known as Multi-access Edge Computing (MEC), which, as is known, indicates the processing of data at the network edges, where they are produced, in a cloud-based processing system external to the motor vehicles 2, the main benefits of which are represented, as is known, by the reduction of the processing latency, which allows real-time responses, and bandwidth saving, sending to the data centre information already processed and hence of smaller size.

In this embodiment, the service for automatically recognising anomalous situations along roads is provided by software applications run in data processing resources 3 provided by roadside edge nodes of a cloud-based processing system, with which the motor vehicles 2 communicate to provide the roadside edge nodes with data such as to enable them to recognise the occurrence of anomalous situations along roads and receive from the roadside edge nodes, in the event of anomalous situations along the roads being recognised, data that can be used for intelligent motor-vehicle driving speed control 2 along roads.

In a further embodiment, the service for automatically recognising anomalous situations along roads can be provided through a hybrid processing architecture, in which a first software application which is run in data processing resources 3 provided by roadside edge nodes of a cloud-based processing system and which performs a rough pre-processing of the data provided by the motor vehicles 2 with which the roadside edge nodes communicate and then sends the pre-processed data to a remote data centre, in which a second software application performs a finer processing of the pre-processed data received from the roadside edge nodes to recognise occurrence of anomalous situations along roads and to provide the motor vehicles 2 with data useful for intelligent motor-vehicle driving speed control 2 along these roads.

Regardless of the architecture used, the data processing resources 3, concentrated or distributed, are designed to automatically recognise anomalous situations along roads by:
  receiving from the motor vehicles 2 data allowing anomalous situations to be recognised along roads travelled by the motor vehicles 2,
  processing the data received from the motor vehicles 2 to recognise anomalous situations along roads travelled by the motor-vehicles 2, in FIG. 1 exemplarily represented by a broken-down motor vehicle stationary off the road with an exposed reflective warning triangle, based on a proprietary recognition algorithm, an embodiment of which is described in detail below,
  when anomalous situations are recognised along roads, generating associated alert events and computing reference driving speeds of the motor-vehicle 2 along the roads recognised to be affected by anomalous situations,
  transmitting to the motor vehicles 2 data representative of the alert events and of the reference driving speeds along the roads recognised to be affected by anomalous situations.

The motor vehicles 2 are designed to:
  transmit data allowing anomalous situations to be recognised along roads travelled by the motor-vehicles 2 and comprising:
    motor-vehicle-related data comprising time-related, position-related, and motion-related data, such as, for example, time tags, position, speed, longitudinal and lateral accelerations, and yaw rate, ADAS function activation data indicative of activation of ADAS functions, e.g., emergency braking (EBS), and optionally, raw ADAS data from ADAS sensors, such as front and/or rear cameras, radars, etc., involved in the ADAS functions, whose activation is signalled in the ADAS function activation data, and telematic functions data such as, for example, eCall, which, as is known, is a mandatory automotive functionality in every new motor vehicle marketed within the EU since April 2018 and which has the purpose of providing rapid assistance to drivers involved in road accidents, wherever they are in the European Union;

receive data representative of alert events and reference driving speeds along the roads recognised to be affected by anomalous situations, and use the received data to implement one or both of the following actions:

inform the drivers of the motor-vehicles 2, through the automotive user interfaces 4 (FIG. 2) of the motor-vehicles 2, of the anomalous situations recognised along roads travelled by motor-vehicles 2, and carry out interventions such as to cause the current driving speeds of the motor-vehicles 2 to be adjusted to the reference driving speeds along the roads recognised to be affected by anomalous situations.

In order to adjust the current driving speeds of the motor-vehicles 2 to the received reference driving speeds, the motor-vehicles 2 are configured to implement at least one of the following actions:

make, through the automotive user interfaces 4, visual/auditory/haptic requests to drivers so that they intervene appropriately on the controls of the motor-vehicles 2, and intervene directly on the automotive systems, in particular braking and engine control systems.

Figure 2:
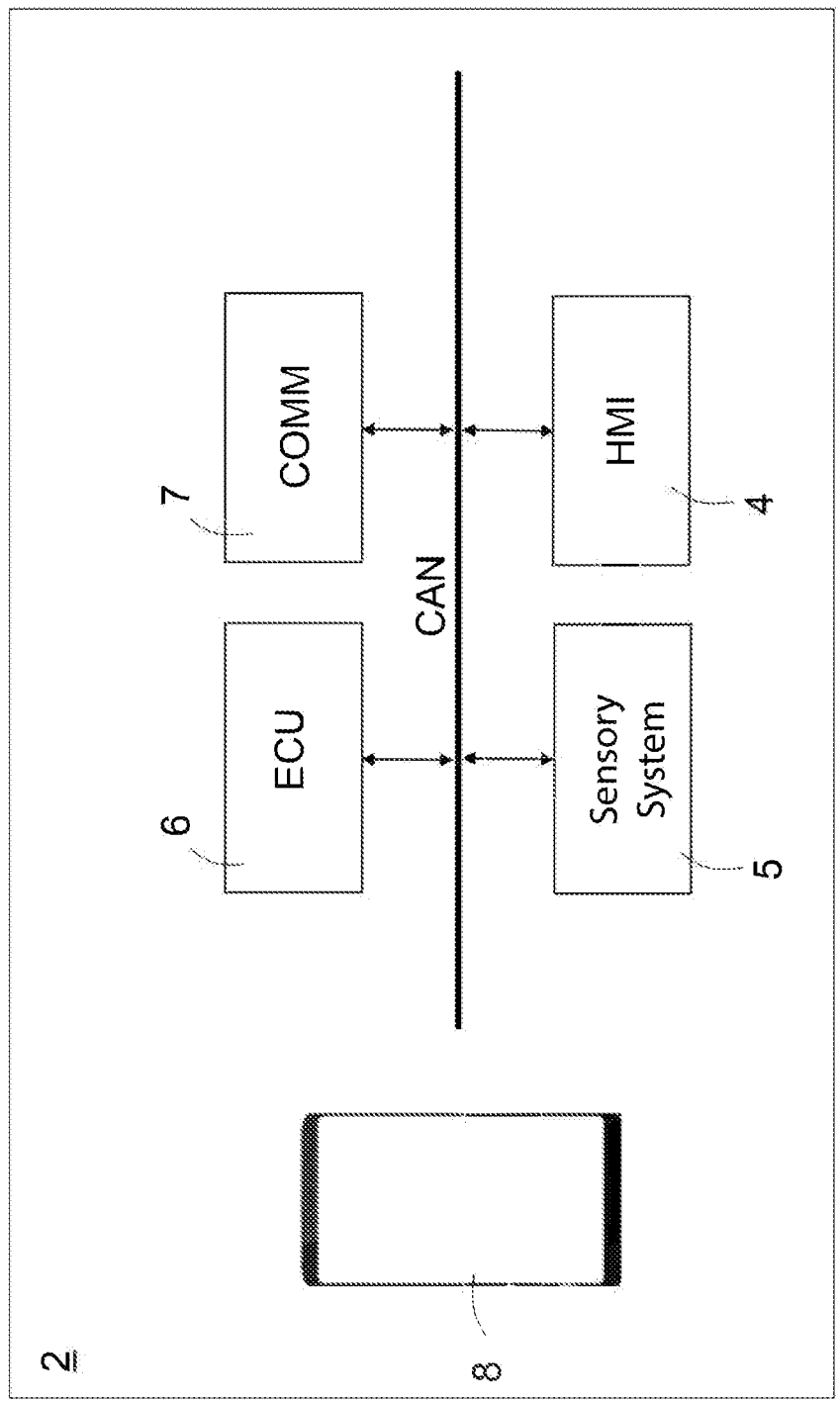
FIG. 2 shows a block diagram of an automotive electronic system.

In order to make available the abovementioned data, as shown in FIG. 2, the motor-vehicles 2 each have a motor-vehicle sensory system 5 designed to output directly, in whole or in part, and/or allow an automotive electronic processing unit 6 to compute the abovementioned data based on data outputted by the automotive sensory system 5.

In particular, the automotive sensory system 5 may comprise a GNSS receiver for computing, based on Signals in Space received by a GNSS antenna, data indicative of the absolute position, in terms of latitude, longitude, altitude, direction and time, of the motor-vehicle 2, one or more cameras comprising at least one front camera and optionally a rear camera, at least one radar, etc.

In order to optimise exploitation of the communication band used by the motor-vehicles 2 to communicate with the data processing resources 3, the motor-vehicles 2 are conveniently designed to reduce the amount of data transmitted as follows:

periodically sending messages each containing a minimum data set (MSD), and for this reason hereinafter referred to as MSD messages, comprising data indicative of the following automotive quantities: time tag, position, speed, longitudinal and lateral accelerations, yaw rate and ADAS functions activations, and sending, in response to specific requests from the data processing resources 3, messages each containing an enriched data set (ESD) comprising ADAS raw data outputted by ADAS sensors involved in the ADAS functions, whose activation is signalled in the MSD messages, and for this reason hereinafter referred to as ESD messages.

The data processing resources 3 are consequently configured to:

compute, based on the received MSD messages, a quantity, described in greater detail below and whose time trend is exemplarily shown in FIG. 3, indicative of the probability that an anomalous situation and/or an event potentially safety-critical for the passengers of the motor-vehicles 2 occurs along the roads travelled by motor-vehicles 2, compare the computed quantity with one or more thresholds, in the example shown in FIG. 3 comprising a lower threshold $\alpha$ and an upper threshold $\beta$, and if the computed quantity has a given relationship with the comparison threshold(s), in the example shown in FIG. 3 it is in the range between the lower $\alpha$ and upper $\beta$ thresholds, send to the motor-vehicles 2 a request for sending additional data so that the situation can be settled in one way or the other, so as to reach a certain classification between presence or absence of an anomaly.

To communicate with the data processing resources 3 dedicated to the recognition of anomalous situations along roads, be they provided by a remote data centre rather than by roadside edge nodes of a cloud-based processing system, or part in one and part in the other, the motor vehicles 2 also have communication interfaces 7 that provide, directly or indirectly, long-range connectivity.

Long-range connectivity is conveniently, but not necessarily, the one provided by existing and future cellular communication technologies, such as 2G, 3G, 4G, 5G, 6G, etc., or by Vehicle-to-Everything (V2X) communication technologies, in such as Cellular V2X (C-V2X), and direct sidelink between vehicle and infrastructure based on IEEE 802.11p-based standards or cellular standards from Rel. 14 onwards (PC5 interface).

In particular, those motor vehicles 2 that natively have short- and long-range connectivity, usually medium-high-end motor vehicles, can therefore be configured to communicate directly with the data processing resources 3 by exploiting their long-range connectivity, so as to transmit the abovementioned data and receive the data representative of the alert events and the computed reference driving speeds, without resorting to non-native communication resources.

Those motor vehicles 2 which instead fail to have natively long-range connectivity, typically medium-low-end motor vehicles, can be configured to communicate with the data processing resources 3 by exploiting long-range radio communication resources provided by user terminals 8 on-board the motor-vehicles 2 and consisting of any hand-held or wearable personal electronic mobile communication devices, such as smartphones, phablets, tablets, personal computers, smartwatches, etc., and, as is known, capable of supporting one or more long-range radio communication technologies of the type described above.

For this purpose, therefore, these motor vehicles 2 must have at least a short-range connectivity to communicate with the user terminals 8 in order to be able to exploit the long-range radio communication resources thereof to communicate with the remote data centre. In this way, these motor-vehicles 2 can communicate with data processing resources 3 using the tethering functionality now offered by almost all smartphones and tablets.

The communication interfaces of the motor-vehicles 2 and of the user terminals 8 must therefore have a short-range connectivity capable of supporting one or different short-range communication technologies comprising, conveniently, wireless communication technologies, such as Bluetooth technology, for example, the one according to the 4.0 specification and also known by the names Bluetooth Low Energy, Bluetooth LE or Bluetooth Smart, ZigBee technology, Wi-Fi technology and possibly also the NFC technology, or wired communication technologies, in particular USB technology.

The tethering functionality aimed at enabling motor vehicles 2 without long-range connectivity with the data processing resources 3, in addition to being activable through the settings menus of the user terminals 8, can also be activated through the software application (APP) that all car manufacturers make available to their customers through the main online APP stores to allow them, once downloaded, installed and properly set on their own user terminals 8, to interact with some automotive systems of their motor vehicles 2, in the example shown, the infotelematic and infoentertainment systems, and in which this functionality is also provided.

It goes without saying that the tethering functionality of the user terminals 8 can also be used by those motor vehicles 2 that natively have a long-range connectivity, as an alternative to the latter.

As regards recognition of anomalous situations along roads, as mentioned previously, the data processing resources 3, be they in the remote data centre rather than in roadside edge nodes of a cloud-based processing system, or part in one and part in the other, are configured to recognise occurrence of anomalous situations based on a proprietary algorithm developed by the provider of the service for automatically recognising anomalous situations and which, therefore, can be different for different service providers.

Examplarily, the data processing resources 3 can be configured to recognise the occurrence of anomalous situations along roads travelled by the motor vehicles 2 by implementing the following recognition algorithm:
1. Recognition of anomalous situation for each road or motorway stretch and time interval by combining the following three approaches:
1.1 Computing an Anomaly Index I Examplarily, the anomaly index I can be computed by using the following formula:

$$I = \sum_{n=1}^{k} a_n \cdot f_n(v_n)$$

where:
vn is an n-th automotive quantity whose values are contained in the received data,
$a_n$ is the weight to be attributed to the n-th automotive quantity vn, and
$f_n$ is a function associated with the n-th automotive quantity vn and which can assume a value between 0 and 1.

Examplarily, the automotive quantities vn may comprise one or more, conveniently two or more, of the following:
$v_1$: longitudinal acceleration,
$v_2$: lateral acceleration,
$v_3$: vertical acceleration,
$v_4$: direction changes/reversing,
$v_5$: yaw rate
$v_6$: actions on the brake (pressure and pressure variation),
$v_7$: motor vehicle speed,
$v_8$: ADAS functions activations, conveniently included in the group comprising AEB, LDW/LKA, ESC, ABS, etc.,
$v_9$: hazard lights operations (four arrows), and
$v_{10}$: recognition of triangular-shaped warning sign placed on the ground.

Examplarily, some of the functions $f_n$ associated with the above-indicated motor-vehicle quantities vn are given below, in which the indicated numerical values are purely indicative and may also assume values different from those indicated:

$$f(v_1) = \begin{cases} 0 & v_1 \geq -1.0 \text{ m/s}^2 \\ 0.25 & -2.5 \leq v_1 < -1.0 \text{ m/s}^2 \text{ per almeno 3 s} \\ 0.5 & -4.0 \leq v_1 < -2.5 \text{ m/s}^2 \text{ per almeno 2 s} \\ 0.75 & -6.0 \leq v_1 < -4.0 \text{ m/s}^2 \text{ per almeno 1 s} \\ 1 & v_1 < -6.0 \text{ m/s}^2 \end{cases}$$

$$f(v_2) = \begin{cases} 0, & v2 \geq -3.0 \text{ m/s}^2 \\ 1, & v2 < -3.0 \text{ m/s}^2 \end{cases}$$

$$f(v_3) = \begin{cases} 0, & |v3| < 1.5 \text{ m/s}^2 \\ 1, & |v3| \geq 1.5 \text{ m/s}^2 \end{cases}$$

$$f(v_4) = \begin{cases} 0, & v4 < 1 \\ 1, & v4 \geq 1 \end{cases}$$

$$f(v_5) = \begin{cases} 0, & |v5| < 1.5 \text{ rad/s} \\ 1, & |v5| \geq 1.5 \text{ rad/s} \end{cases}$$

$$f(v_6) = \begin{cases} 0, & |v6| < 50 \text{ bar} \\ 1, & |v6| \geq 50 \text{ bar} \end{cases}$$

$$f(v_7) = \begin{cases} 0 & -20\% \text{ Vmean} \leq v_7 \leq +20\% \text{ Vmean} \\ 1, & |v7| > +20\% \text{ Vmean} \end{cases}$$

$$f(v_8) = \begin{cases} 0, & v8 = 0 \\ 1, & v8 \geq 1 \end{cases}$$

$$f(v_9) = \begin{cases} 0, & v9 < 1 \\ 1, & v9 \geq 1 \end{cases}$$

$$f(v_{10}) = \begin{cases} 0, & v10 < 1 \\ 1, & v10 \geq 1 \end{cases}$$

According to one aspect of the invention, in order to speed up identification of an anomalous situation through the anomaly index I, the weight $a_n$, to be attributed to the n-th automotive quantity vn can be computed based on the following formula:

$$a_n = a_{n\_0} \cdot (1 + \max(0, (f_n(v_n) - TH)))$$

where:
$a_{n\_0}$ represents a nominal value of the weight $a_n$,
TH=0.5 for functions $f_n$ assuming only two values 0 and 1, and
TH=0.75 for functions $f_n$ assuming more than two values.

Examplarily, some of possible nominal values $a_{n\_0}$ of the weights $a_n$ attributable to the above-indicated functions $f_n$ are given below:

$$a_{1\_0} = 0.8 \quad a_{2\_0} = 0.8 \quad a_{3\_0} = 0.3 \quad a_{4\_0} = 0.8 \quad a_{5\_0} = 0.9$$

$$a_{6\_0} = 0.6 \quad a_{7\_0} = 0.8 \quad a_{8\_0} = 0.8 \quad a_{9\_0} = 0.9 \quad a_{10\_0} = 0.9$$

1.2. Comparison with Statistical Distributions of Non-Anomalous Situations

The values of the automotive quantities vn in the received data are compared with statistical distributions of populations of values that are relative to non-anomalous situations and are cleaned of notably anomalous situations according to the judgement of a jury of experts, according to criteria of definition of anomalous situations comprising, examplarily:

- presence of danger signalling (hazard lights, gestures, etc.),
- presence of traffic-unrelated objects (animals, pedestrians on the roadway, objects, etc.),
- emergency manoeuvres performed by one or more motor-vehicles,
- motor-vehicles that have very different driving speeds than the computed reference speeds (traffic obstruction speed, speeding)
- motor-vehicles that commit repeated or continuous violations of traffic rules (dangerous driving, stop on the roadway, driving in opposite direction, etc.).

The comparison is carried out by means of statistical tests, the result of which is represented by the probability of not belonging to the reference population.

1.3. Use of Suitably Trained Classifiers

Machine Learning algorithms are trained by using the populations of values of the quantities described in point 1.1 and labelled as anomalous or non-normal according to the judgement of the jury of experts, following the criteria of definition of anomalous situation defined in point 1.2.

The output will be the probability that a situation is anomalous or non-normal.

2. Combination of Approaches

Normalising the outputs of the approaches 1, 2 and 3 in an interval [−A, +B].

Incremental sum S over time of the outputs of the approaches in respect of the associated stretch Conversion of incremental output into anomaly probability p according to the formula:

$$p = \frac{e^S}{1 + e^S}$$

3. Identification of an Anomaly

An anomalous situation is identified if the probability p exceeds a pre-established minimum threshold Th_Anomaly (anomaly present or absent in the associated road stretch).

Additional thresholds may be provided to identify increasing levels of anomaly probability.

Below is a numerical example of the application of the anomaly identification algorithm described above.

Consider [−A, +B]=[−0.1, 0.3], where a positive value is indicative of an increased anomaly probability. It is also considered a given segment x of a road travelled by a motor-vehicle 2 which at the instant t=0 has an anomaly probability equal to 0.5 (uncertain starting situation), i.e. S=0.

Five possible consecutive instants of time for a given road stretch x are examplarily reported in the following table:

| t | Approach 1 | Approach 2 | Approach 3 | S | Probability [0, 1] |
|---|---|---|---|---|---|
| 0 | — | — | — | 0 | 0.5 |
| 1 | 0.23 | 0.17 | −0.02 | 0.38 | 0.59 |
| 2 | 0.19 | 0.25 | 0.29 | 0.87 | 0.70 |
| 3 | 0.20 | 0.15 | 0.20 | 1.42 | 0.80 |
| 4 | 0.18 | 0.19 | −0.1 | 1.78 | 0.86 |
| 5 | 0.22 | 0.23 | 0.15 | 2.38 | 0.92 |

As can be appreciated, the anomaly information strengthens over time and the possible different variance of the algorithms is limited by the fusion mechanism.

If the algorithms provide consistent information, the identification of the anomalous situation will be faster. In any case, even if one of the algorithms provides inconsistent outputs from time to time, the fusion mechanism allows to filter it, providing still robust output.

Values greater than Th_Anomaly=0.55 indicate the identification of a road stretch with an anomaly.

Based on what has been described, the advantages which the present invention allows to be obtained are clear.

In particular, the present invention allows to realize an ISA capable of being applied to new contexts in which the solutions according to the prior art do not find application.

Moreover, the combination of the three approaches described above, which are complementary to each other, represents an innovative element that allows to face the same problem, being able to combine at best the requirements of reliability and explicability, without however losing potentiality/robustness on rare or extremely complex situations.

In fact:

- the first approach is based on technical considerations from engineering data observation. The advantage is to have a reliable and explainable behaviour of the estimate, the limit is that of not being able to manage extremely rare or extremely complex situations;
- the second approach uses a massive amount of data that is purely non-anomalous and has the advantage of being able to produce anomaly estimates for extremely rare events, based on big data and with little or no human intervention; and
- the third approach has the advantage of using the technical knowledge of anomalous situations to construct very complex patterns of recognition thereof, which are difficult to reconstruct from mere engineering considerations (approach 1).

The invention claimed is:

1. A system for automatically recognising anomalous situations along roads travelled by motor-vehicles for intelligent motor-vehicle driving speed control along the roads;

wherein the motor-vehicles are configured to transmit data allowing anomalous situations to be recognised along roads travelled by the motor-vehicles;

the system comprises data processing resources configured to that:

receive and process data transmitted by the motor-vehicles to recognise anomalous situations along the roads travelled by the motor-vehicles based on a recognition algorithm, when anomalous situations are recognised along the roads travelled by the motor-vehicles, generate associated alert events and compute reference driving speeds along the roads recognised to be affected by anomalous situations, and transmit data representative of the alert events and of the reference driving speeds along the roads recognised to be affected by anomalous situations; the motor-vehicles are further configured to:

receive data representative of alert events and reference driving speeds, and use the received data to implement one or both of the following actions:

inform the drivers of the motor-vehicles of the anomalous situations recognised along the roads travelled by motor-vehicles, and cause the current driving speeds of the motor-vehicles to be adjusted to the reference driving speeds along the roads recognised to be affected by anomalous situations;
wherein the data processing resources are further configured to recognise occurrence of anomalous situations along the roads travelled by motor-vehicles based on the following multi-approach recognition algorithm:
i) computing an anomaly index (1) based on values of one or more automotive quantities contained in the received data, according to a formula such as:

$$I = \sum_{n=1}^{k} a_n \cdot f_n(v_n)$$

where:
v$_n$ is the n-th automotive quantity,
a$_n$ is the weight to be attributed to the n-th automotive quantity v$_n$ and
f$_n$ is a function that is associated with the n-th automotive quantity v$_n$
ii) comparing the values of the automotive quantities contained in the received data with statistical distributions of populations of values that are relative to non-anomalous situations and have been cleaned of anomalous situations; the comparison returning a probability of not belonging to the reference population;
iii) training Machine Learning algorithms by using the above-mentioned populations of values of the automotive quantities, the training returning the probability for a situation to be anomalous or non-anomalous;
iv) computing an anomaly probability p based on the outputs of the approaches i), ii) and iii);
v) comparing the anomaly probability p with a pre-established minimum threshold (Th_Anomaly); and
vi) identifying an anomalous situation if the anomaly probability p exceeds the pre-established minimum threshold (Th_Anomaly);
and wherein, in order to speed up identification of an anomalous situation through the anomaly index /, the data processing resources are further configured to compute the weight a$_n$ to be attributed to the n-th automotive quantity v$_n$, based on the following formula:

$$a_n = a_{n_x} \cdot (1 + \max(0, (f_n((v)_n) - TH)))$$

where:
a$_{n\_o}$ represents a nominal value of the weight a$_n$, and
TH is a threshold value which depends on the value assumed by the function f$_n$ associated with the n-th automotive quantity v$_n$;
wherein the automotive quantities comprise:
longitudinal/lateral/vertical accelerations,
direction changes/reversing,
yaw rate,
motor vehicle speed,
ADAS functions activations, conveniently included in the group comprising AEB, LDW/LKA, ESC, ABS, and
recognition of triangular-shaped warning sign placed on the ground;
wherein the motor vehicles are further configured to cause their current driving speeds to be adjusted to the reference driving speeds by:
making visual/auditory/haptic requests to drivers, and
intervening on braking and engine control systems of the motor-vehicles.

2. The system of claim 1, wherein step iv) comprises:
normalising the outputs of the approaches i), ii) and iii) in a given interval of values [−A, +B],
computing an incremental sum S over time of the outputs of the approaches i), ii) and iii) relating to the same associated road stretch, and
computing the anomaly probability p based on the incremental sum S according to the formula:

$$p = \frac{e^S}{1 + e^S}.$$

3. The system of claim 1, wherein the criteria of definition of anomalous situations comprise one or more of the following:
presence of danger signalling,
presence of traffic-unrelated objects,
emergency manoeuvres performed by one or more motor-vehicles,
motor-vehicles that have very different current driving speeds than the computed reference driving speeds, and
motor-vehicles that commit repeated or continuous violations of traffic rules.

4. The system of claim 1, wherein the motor-vehicles are further configured to communicate with personal electronic mobile communication devices on-board the motor-vehicles through a wireless or wired short-range connectivity, so as to transmit data allowing anomalous situations to be recognised along the roads travelled by motor-vehicles by exploiting long-range radio communication resources of the personal electronic mobile communication devices on-board the motor-vehicles.

5. The system of claim 1, wherein the data allowing anomalous situations to be recognised along the roads travelled by motor-vehicles comprises:
motor-vehicle-related data comprising time-related, position-related, and motion-related data,
ADAS function activation data indicative of activations of ADAS functions, and, optionally,
ADAS raw data from ADAS sensors involved in the ADAS functions, whose activation is signalled in the ADAS function activation data.

6. The system of claim 1, wherein the motor-vehicles are further configured to transmit data allowing anomalous situations to be recognised along the roads travelled by motor-vehicles by:
periodically sending messages each containing a minimum data set, and
sending, in response to requests from the data processing resources, messages each containing an enriched data set.

7. The system of claim 6, wherein the data processing resources are further configured to:
receive messages containing minimum data sets,
compute, based on the received minimum data sets, a quantity indicative of a probability that an anomalous situation and/or an event potentially safety-critical for the passengers of the motor-vehicles occurs along the roads travelled by the motor-vehicles,
compare the computed quantity with one or different thresholds,
request the motor-vehicles to send enriched data sets when the computed quantity satisfy a given relationship with the one or more thresholds,
receive messages containing enriched data sets, and recognise occurrence of an anomalous situation and/or an event potentially safety-critical for the passengers of the motor-vehicles also based on the received enriched data sets.

8. The system of claim 6, wherein a minimum data set comprises data indicative of the following automotive quantities:
Time tag
Position
Speed
Longitudinal acceleration
Lateral acceleration
Yaw rate
Activation of ADAS functions,
and wherein an enriched data set comprises ADAS raw data outputted by ADAS sensors involved in the ADAS functions, whose activation is signalled in the periodic messages.

9. A system for automatically recognising anomalous situations along roads travelled by motor-vehicles for intelligent motor-vehicle driving speed control along the roads;
wherein the motor-vehicles are configured to transmit data allowing anomalous situations to be recognised along the roads travelled by the motor-vehicles;
the system comprises data processing resources configured to:
receive and process data transmitted by the motor-vehicles to recognise anomalous situations along the roads travelled by the motor-vehicles based on a recognition algorithm,
when anomalous situations are recognised along the roads travelled by the motor-vehicles, generate associated alert events and compute reference driving speeds along the roads recognised to be affected by anomalous situations, and
transmit data representative of the alert events and of the reference driving speeds along the roads recognised to be affected by anomalous situations;
the motor-vehicles are further configured to:
receive data representative of alert events and reference driving speeds, and
use the received data to implement one or both of the following actions:
inform the drivers of the motor-vehicles of the anomalous situations recognised along roads travelled by motor-vehicles, and
cause current driving speeds of the motor-vehicles to be adjusted to the reference driving speeds along roads recognised to be affected by anomalous situations;
wherein the motor-vehicles are further configured to transmit data allowing anomalous situations to be recognised along the roads travelled by the motor-vehicles by:
periodically sending messages each containing a minimum data set, and
sending, in response to requests from the data processing resources, messages each containing an enriched data set;
wherein the data processing resources are further configured to recognise occurrence of anomalous situations along roads travelled by motor-vehicles based on the following multi-approach recognition algorithm:
i) computing an anomaly index (I) based on values of one or more automotive quantities in the received data, according to a formula such as:

$$I = \sum_{n=1}^{k} a_n \cdot f_n(v_n)$$

where:
$v_n$ is the n-th automotive quantity,
$a_n$ is the weight to be attributed to the n-th automotive quantity $v_n$ and
$f_n$ is a function that is associated with the n-th automotive quantity $v_n$ and that can assume a value comprised between 0 and 1;
ii) comparing the values of the automotive quantities contained in the received data with statistical distributions of populations of values that are relative to non-anomalous situations and are cleaned of anomalous situations; the comparison returning a probability of not belonging to the reference population;
iii) training Machine Learning algorithms by using the abovementioned populations of values of the automotive quantities, the training returning the probability for a situation to be anomalous or non-normal;
iv) computing an anomaly probability p based on the outputs of the approaches i), ii) and iii);
v) comparing the anomaly probability p with a pre-established minimum threshold (Th_Anomaly); and
vi) identifying an anomalous situation if the anomaly probability p exceeds the pre-established minimum threshold (Th_Anomaly):
wherein, in order to speed up the identification of an anomalous situation through the anomaly index /, the data processing resources are further configured to compute the weight $a_n$ to be attributed to the n-th automotive quantity $v_n$ is computed based on the following formula:

$$a_n = a_{n\_o} \cdot (1 + \max(0,(f_n((v)_n) - TH)))$$

where:
$a_{n\_o}$ represents a nominal value of the weight $a_n$, and
TH is a threshold value which depends on the value assumed by the function $f_n$ associated with the n-th automotive quantity $v_n$.

10. The system of claim 9, wherein the data processing resources are further configured to:
receive messages containing minimum data sets,
compute, based on the received minimum data sets, a quantity indicative of a probability that an anomalous situation and/or an event potentially safety-critical for the passengers of the motor-vehicles occurs along the roads travelled by the motor-vehicles,
compare the computed quantity with one or different thresholds,
request the motor-vehicles to send enriched data sets when the computed quantity satisfy a given relationship with the one or more thresholds,
receive messages containing enriched data sets, and
recognise occurrence of an anomalous situation and/or an event potentially safety-critical for the passengers of the motor-vehicles also based on the received enriched data sets.

11. The system of claim 9, wherein a minimum data set comprises data indicative of the following automotive quantities:
Time tag
Position
Speed
Longitudinal acceleration Lateral acceleration Yaw rate Activation of ADAS functions;

and wherein an enriched data set comprises ADAS raw data outputted by ADAS sensors involved in the ADAS functions, whose activation is signalled in the periodic messages.

12. The system of claim 9, wherein the motor vehicles are further configured to cause their current driving speeds to be adjusted to the reference driving speeds by implementing at least one of the following actions:

making visual/auditory/haptic requests to drivers, and intervening on automotive systems of the motor-vehicles.

13. The system of claim 9, wherein the motor-vehicles are further configured to communicate with personal electronic mobile communication devices on-board the motor-vehicles through a wireless or wired short-range connectivity, so as to transmit data allowing anomalous situations to be recognised along the roads travelled by motor-vehicles by exploiting long-range radio communication resources of the personal electronic mobile communication devices on-board the motor-vehicles.

14. The system of claim 9, wherein the data allowing anomalous situations to be recognised along roads travelled by motor-vehicles comprise:

motor-vehicle-related data comprising time-related, position-related, and motion-related data, ADAS function activation data indicative of activation of ADAS functions, and, optionally ADAS raw data from ADAS sensors involved in the ADAS functions, whose activation is signalled in the ADAS function activation data.

15. The system of claim 9, wherein step iv) comprises:

normalising the outputs of the approaches i), ii) and iii) in a given interval of values [−A, +B], computing an incremental sum S over the output time of each approach to a stretch of associated road, and computing the anomaly probability p based on the incremental sum S according to the formula:

$$p = \frac{e^S}{1+e^S}.$$

16. The system of claim 9, wherein the automotive quantities comprise one or more of the following:

longitudinal/lateral/vertical accelerations, direction changes/reversing, yaw rate, actions on the brake (pressure and pressure variation), motor vehicle speed, ADAS functions interventions, conveniently included in the group comprising AEB, LDW/LKA, ESC, ABS, hazard lights insertion (four arrows), and recognition of triangular-shaped warning sign placed on the ground.

17. The system of claim 9, wherein the criteria of definition of anomalous situations comprise one or more of the following:

presence of danger signalling, presence of traffic-unrelated objects, emergency manoeuvres performed by one or more motor-vehicles, motor-vehicles that have very different current driving speeds than the computed reference driving speeds, and motor-vehicles that commit repeated or continuous violations of traffic rules.

\* \* \* \* \*